(12) United States Patent
Kodama

(10) Patent No.: US 12,647,693 B2
(45) Date of Patent: Jun. 2, 2026

(54) IMAGING DEVICE, ELECTRONIC DEVICE, AND LIGHT DETECTING METHOD

(71) Applicant: Sony Semiconductor Solutions Corporation, Kanagawa (JP)

(72) Inventor: Kazutoshi Kodama, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 152 days.

(21) Appl. No.: 18/558,636

(22) PCT Filed: Mar. 9, 2022

(86) PCT No.: PCT/JP2022/010374
§ 371 (c)(1),
(2) Date: Nov. 2, 2023

(87) PCT Pub. No.: WO2022/270034
PCT Pub. Date: Dec. 29, 2022

(65) Prior Publication Data
US 2024/0236519 A1     Jul. 11, 2024

(30) Foreign Application Priority Data

Jun. 23, 2021     (JP) ................................. 2021-104406

(51) Int. Cl.
*H04N 25/47*          (2023.01)
*H04N 25/53*          (2023.01)
(52) U.S. Cl.
CPC ............. *H04N 25/47* (2023.01); *H04N 25/53* (2023.01)
(58) Field of Classification Search
CPC ........ H04N 25/47; H04N 25/53; H04N 25/40; H04N 25/7795; H04N 25/78
See application file for complete search history.

(56) References Cited

U.S. PATENT DOCUMENTS

| | | | | |
|---|---|---|---|---|
| 12,063,444 | B1 * | 8/2024 | Schon | H04N 25/77 |
| 2021/0258525 | A1 * | 8/2021 | Matolin | H04N 25/76 |

(Continued)

FOREIGN PATENT DOCUMENTS

| | | |
|---|---|---|
| JP | 2015501936 A | 1/2015 |
| JP | 2017050853 A | 3/2017 |

(Continued)

OTHER PUBLICATIONS

International Search Report (PCT/ISA/210), International Application No. PCT/JP2022/010374, dated May 24, 2022.

*Primary Examiner* — Shahbaz Nazrul
(74) *Attorney, Agent, or Firm* — Michael Best & Friedrich LLP

(57)          ABSTRACT

[Problem] To provide an imaging device by which data about a luminance change of incident light can be outputted at high speeds.

[Solution] The imaging device according to an embodiment of the present disclosure includes: a pixel array including a plurality of pixel circuits arranged in rows and columns, the pixel circuits photoelectrically converting incident light; a timing control circuit that specifies a detection pixel row or a detection pixel column including the pixel circuit having detected a luminance change of the incident light among the plurality of pixel circuits, on the basis of a first signal outputted for each row or each column from the pixel array; and a reading circuit that reads the first signal of the detection pixel row or the detection pixel column from the pixel array.

7 Claims, 21 Drawing Sheets

(56)            References Cited

U.S. PATENT DOCUMENTS

2024/0107189 A1 *   3/2024   Guo ....................... H04N 25/77
2024/0353386 A1 *  10/2024   Takatsuka ............ G01N 15/075
2024/0380993 A1 *  11/2024   Finateu ................. H04N 25/47

FOREIGN PATENT DOCUMENTS

JP          2018148553  A      9/2018
JP          2020068522  A      4/2020
JP          2020161993  A     10/2020
JP          2020174240  A     10/2020

* cited by examiner

Fig. 11

FRAME A

| FS | | |
|----|----|----|
| PH | Event | PF |
| PH | Event | PF |
| PH | Event | PF |
| PH | Event | PF |
| PH | Event | PF |
| PH | Event | PF |
| PH | EMB(time stamp) | PF |

FRAME B

| PH | Event | PF |
|----|----|----|
| PH | Event | PF |
| PH | Event | PF |
| PH | Event | PF |
| PH | dummy | PF |
| PH | dummy | PF |
| PH | EMB(time stamp) | PF |

FRAME C

| PH | Event | PF |
|----|----|----|
| PH | Event | PF |
| PH | Event | PF |
| PH | Event | PF |
| PH | dummy | PF |
| PH | dummy | PF |
| PH | EMB(time stamp) | PF |

FRAME D

| PH | dummy | PF |
|----|----|----|
| PH | dummy | PF |
| PH | dummy | PF |
| PH | dummy | PF |
| PH | dummy | PF |
| PH | dummy | PF |
| PH | EMB(time stamp) | PF |
| FE | | |

DATA LENGTH

FRAME LENGTH

| FS | | | |
|---|---|---|---|
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | | |
| FE | | | |

Fig. 18

| PH | header | Intensity | EVS | PF |
|----|--------|-----------|-----|-----|

Fig. 19

| PH | header | Intensity | header | EVS | PF |
|----|--------|-----------|--------|-----|-----|

IMAGING DEVICE, ELECTRONIC DEVICE, AND LIGHT DETECTING METHOD

TECHNICAL FIELD

The present disclosure relates to an imaging device, an electronic device, and a light detecting method.

BACKGROUND ART

As an event-driven imaging device, an imaging device called an EVS (Event-based Vision Sensor) is known. If an event (e.g., a movement) occurs in a scene, an EVS outputs data on a part where a luminance level is changed by the event. For EVSs, an arbiter method and a scan method are known. The arbiter method specifies pixels in which a change of the luminance of incident light has been detected, by arbitrating signals outputted from a plurality of pixels arranged in a pixel array. The scan method sequentially selects rows of detection pixels from the pixel array and determines whether the luminance of incident light has been changed on the basis of signals outputted from each of the rows.

CITATION LIST

Patent Literature

[PTL 1]
    JP 2018-148553A
[PTL 2]
    Japanese Translation of PCT Application No. 2015-501936
[PTL 3]
    JP 2020-68522A

SUMMARY

Technical Problem

In an EVS, the number of detection pixels for detecting a luminance change of incident light changes according to an imaging environment. However, an EVS according to the scan method reads the signals of all rows from a pixel array on the basis of the order of selection, regardless of the number of detection pixels. This leaves room for improvement in high-speed data output capability demanded of an EVS.

The present disclosure relates to an imaging device, an electronic device, and a light detecting method, by which data about a luminance change of incident light can be outputted at high speeds.

Solution to Problem

An imaging device according to an embodiment of the present disclosure includes: a pixel array including a plurality of pixel circuits arranged in rows and columns, the pixel circuits photoelectrically converting incident light; a timing control circuit that specifies a detection pixel row or a detection pixel column including the pixel circuit having detected a luminance change of the incident light among the plurality of pixel circuits, on the basis of a first signal outputted for each row or each column from the pixel array; and a reading circuit that reads the first signal of the detection pixel row or the detection pixel column from the pixel array.

The timing control circuit may transmit a frame synchronizing signal with a predetermined period, and the reading circuit may read the first signal across the plurality of frame synchronizing signals.

The reading circuit may read the first signal at certain intervals across the plurality of frame synchronizing signals.

The timing control circuit may transmit a frame synchronizing signal in synchronization with the completion of the reading of the first signal by the reading circuit.

The imaging device may further include an EVS signal processing unit that processes the first signal read from the reading circuit, wherein the EVS signal processing unit may embed at least one piece of dummy data in first output data according to the number of detection pixel rows or the number of detection pixel columns.

The EVS signal processing unit may embed the dummy data such that a plurality of frames have an equal number of pieces of the first output data.

The EVS signal processing unit may combine the first output data of the plurality of frames.

The EVS signal processing unit may embed a frame start in the first output data of the leading frame of the plurality of frames and embed a frame end in the first output data of the last frame.

The first output data of the last frame may only include the dummy data.

Each of the plurality of pixel circuits may include a first pixel circuit that outputs the first signal and a second pixel circuit that outputs a second signal corresponding to the luminance of the incident light, and the imaging device may further include an output interface that simultaneously outputs the first output data obtained by processing the first signal and second output data obtained by processing the second signal.

The plurality of second pixel circuits may be provided for the first pixel circuit.

The output interface may output the first output data and the second output data by using different virtual channels.

The output interface may output a combination of multiple pieces of the first output data and a piece of the second output data.

The first output data and the second output data may be embedded in the same data row.

A data header indicating an area of the first output data and an area of the second output data may be embedded.

The data header may be embedded at the head of the first output data and the head of the second output data.

An electronic device according to an embodiment of the present disclosure includes an imaging device including: a pixel array including a plurality of pixel circuits arranged in rows and columns, the pixel circuits photoelectrically converting incident light: a timing control circuit that specifies a detection pixel row or a detection pixel column including the pixel circuit having detected a luminance change of the incident light among the plurality of pixel circuits, on the basis of a first signal outputted for each row or each column from the pixel array; and a reading circuit that reads the first signal of the detection pixel row or the detection pixel column from the pixel array.

A light detecting method according to an embodiment of the present disclosure, including:
    specifying a detection pixel row or a detection pixel column including a pixel circuit having detected a luminance change of incident light among a plurality of pixel circuits, on the basis of a first signal outputted for each row or each column from a pixel array including the plurality of pixel circuits arranged in rows and columns, the pixel circuits photoelectrically converting the incident light; and reading the first signal of the detection pixel row or the detection pixel column from the pixel array.

BRIEF DESCRIPTION OF DRAWINGS

FIG. 11 shows a structural example of EVS data according to a fourth embodiment.

FIG. 15 shows an example of the output format of the EVS data and gradation data.

FIG. 16 shows another example of the output format of the EVS data and the gradation data.

FIG. 17 shows still another example of the output format of the EVS data and the gradation data.

FIG. 18 shows is an example of the structure of a data set including luminance data and event data.

FIG. 19 shows is an example of the structure of a data set including luminance data and event data.

DESCRIPTION OF EMBODIMENTS

Hereinafter, embodiments of an imaging device and a light detecting method will be described with reference to the accompanying drawings. The principal components of the imaging device will be mainly described below. Some components or functions of the imaging device may be omitted in the illustration or description. The following description does not exclude components or functions that are not illustrated or described.

First Embodiment

Figure 1:
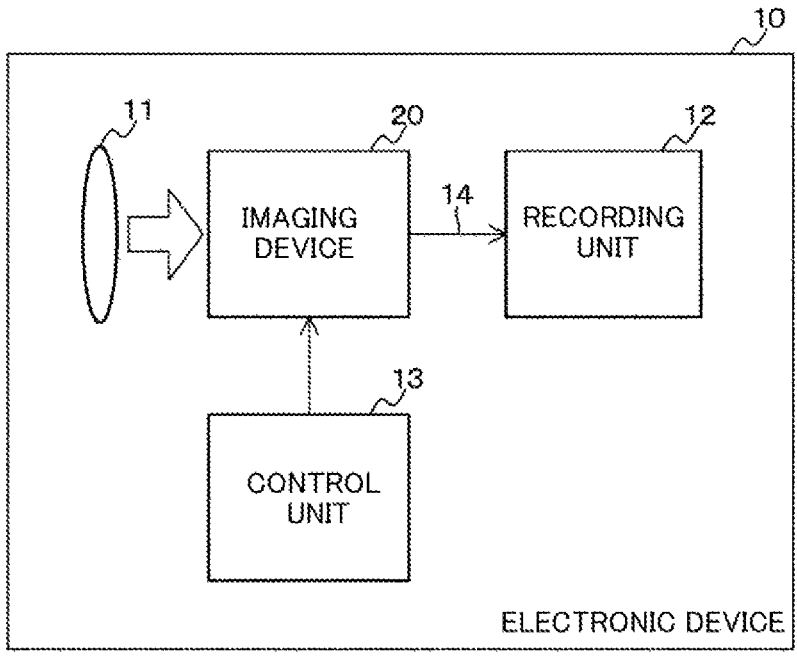
FIG. 1 is a block diagram illustrating a configuration example of an electronic device in which an imaging device according to a first embodiment is mounted.

FIG. 1 is a block diagram illustrating a configuration example of an electronic device in which an imaging device according to a first embodiment is mounted.

An electronic device 10 in FIG. 1 includes an imaging lens 11, an imaging device 20, a recording unit 12, and a control unit 13. The electronic device 10 is applicable to, for example, a camera system mounted in a communication device, e.g., a smartphone, a camera system mounted in an industrial robot, and an onboard camera system.

The imaging lens 11 captures incident light from a subject and forms an image on an imaging surface of the imaging device 20. The imaging device 20 photoelectrically converts, for each pixel, incident light collected through the imaging lens 11 and acquires imaging data.

The imaging device 20 performs predetermined signal processing such as image recognition on image data having been imaged, and outputs data about the processing result to the recording unit 12. The recording unit 12 stores data supplied from the imaging device 20 through a signal line 14. The control unit 13 is configured with, for example, a microcomputer and controls an imaging operation in the imaging device 20.

Figure 2:
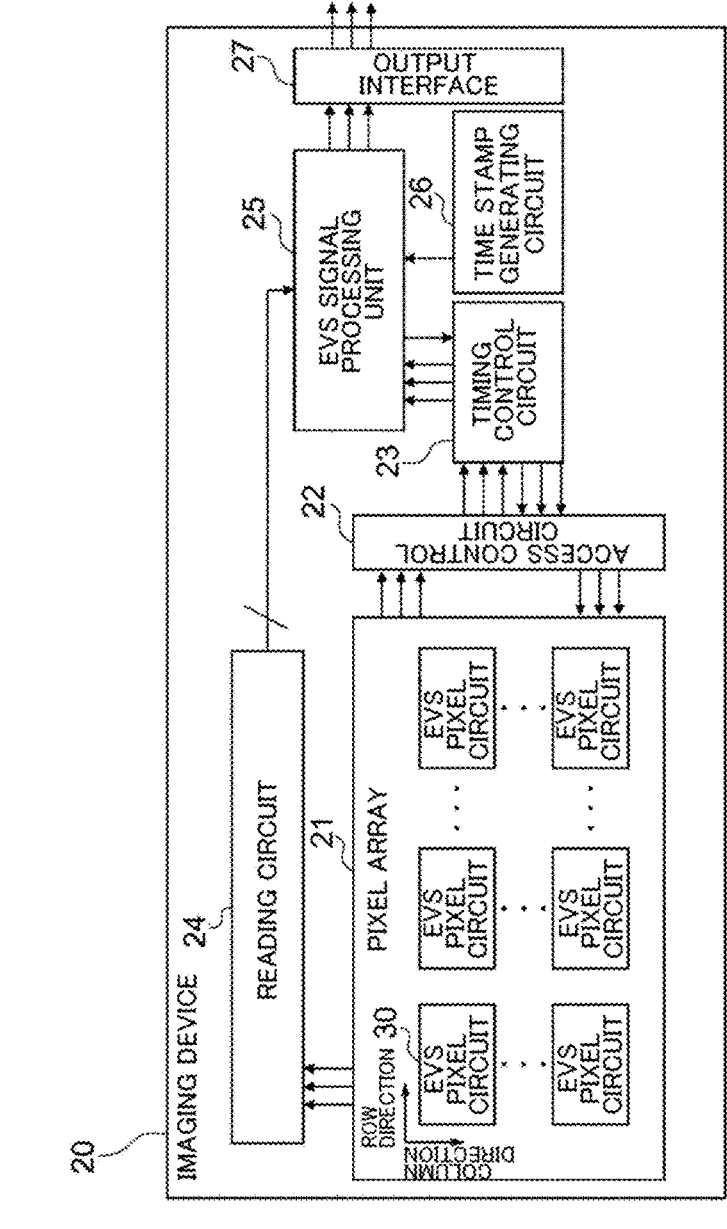
FIG. 2 is a block diagram illustrating the configuration of the imaging device according to the first embodiment.

FIG. 2 is a block diagram illustrating the configuration of the imaging device 20 according to the first embodiment. The imaging device 20 in FIG. 2 is an imaging device according to a scan method. The imaging device 20 includes a pixel array 21, an access control circuit 22, a timing control circuit 23, a reading circuit 24, an EVS signal processing unit 25, a time stamp generating circuit 26, and an output interface 27.

The pixel array 21 includes a plurality of EVS pixel circuits 30 (first pixel circuits) in a two-dimensional array of rows and columns. Each of the EVS pixel circuits 30 generates a voltage signal photoelectrically converted from incident light. Moreover, each of the EVS pixel circuits 30 outputs a luminance change signal (first signal) indicating whether the luminance of incident light has been changed, on the basis of the generated voltage signal. The luminance change signals are outputted for each row (every row). The luminance change signals may be outputted for each column (every column).

The access control circuit 22 is configured with, for example, a shift register and accesses the EVS pixel circuits 30 under the control of the timing control circuit 23. The access allows the reading circuit 24 to read the luminance change signal of each of the EVS pixel circuits 30.

The timing control circuit 23 transmits a frame synchronizing signal to each circuit in the imaging device 20. The frame synchronizing signal is a signal transmitted with a period of repeated processing of one frame in the imaging device 20. Moreover, the timing control circuit 23 specifies a detection pixel row having detected an event, on the basis of the luminance change signals inputted from the pixel array 21 through the access control circuit 22. The detection pixel row includes at least one active pixel circuit. The active pixel circuit is a pixel circuit in which a voltage value corresponding to the luminance of incident light exceeds or falls below a predetermined threshold value. If the luminance change signals of each column are outputted from the pixel array 21, the timing control circuit 23 specifies a detection pixel column having detected an event. The detection pixel column also includes at least one active pixel circuit.

The reading circuit 24 reads, from the pixel array 21, the luminance change signals of the detection pixel row specified by the timing control circuit 23. In other words, the reading circuit 24 only reads the luminance change signals of the detection pixel row including an active pixel instead of reading the luminance change signals of all the rows of the pixel array 21. If the luminance change signals of each column are outputted from the pixel array 21, the reading circuit 24 reads, from the pixel array 21, the luminance change signals of a detection pixel column specified by the timing control circuit 23. In other words, the reading circuit 24 only reads the luminance change signals of the detection pixel column including an active pixel instead of reading the luminance change signals of all the columns of the pixel array 21.

The EVS signal processing unit 25 performs the predetermined signal processing on the luminance change signal read by the reading circuit 24. For example, the EVS signal processing unit 25 creates EVS data for each frame separated by the frame synchronizing signal. The EVS data includes, for example, the address of the detection pixel row (or detection pixel column) and a time stamp indicating time information about the detection of an event.

The time stamp generating circuit 26 generates a time stamp that is time information about the detection of a luminance change of incident light in the EVS pixel circuits 30 of the pixel array 21. The time stamp generating circuit 26 outputs the generated time stamp to the EVS signal processing unit 25.

The output interface 27 outputs the EVS data as first output data of the EVS signal processing unit 25 to the recording unit 12.

Figure 3:
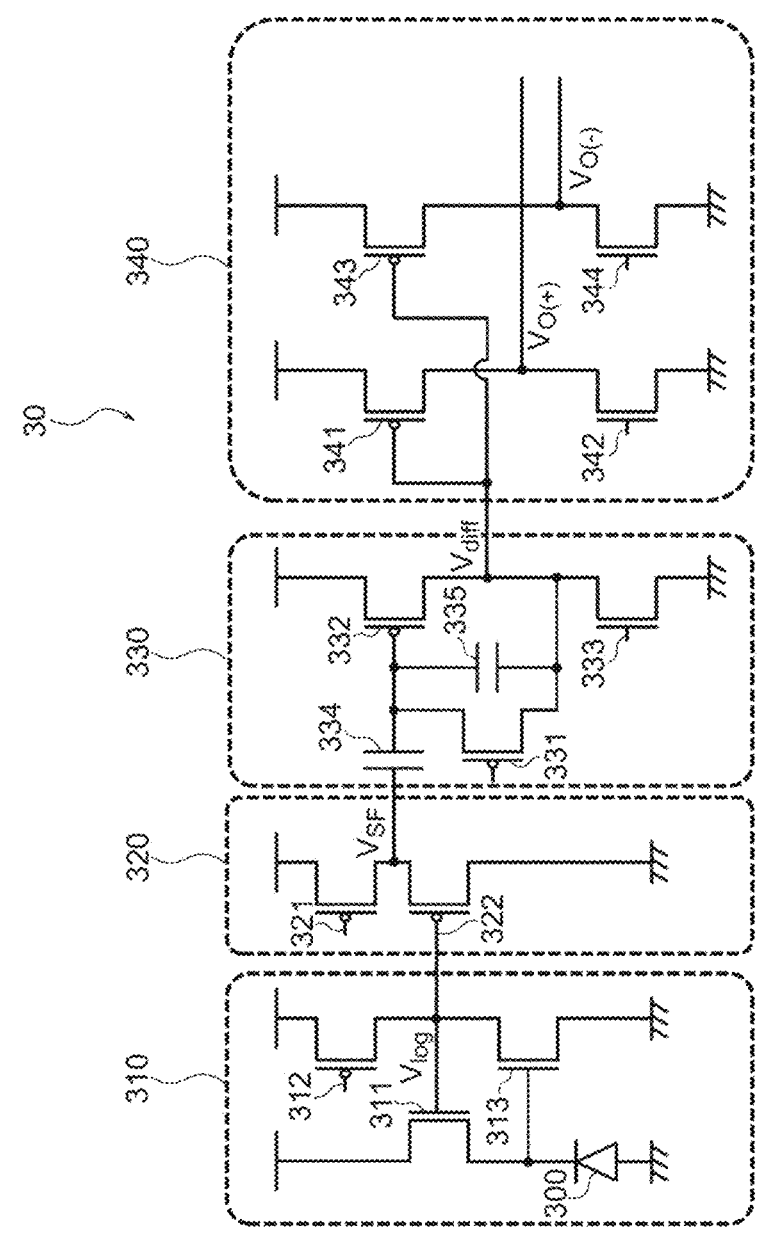
FIG. 3 is a circuit diagram illustrating the configuration of an EVS pixel circuit.

FIG. 3 is a circuit diagram illustrating the configuration of the EVS pixel circuit 30. The EVS pixel circuit 30 in FIG. 3 is an example of an EVS pixel circuit and includes a logarithmic converter circuit 310, a buffer circuit 320, a subtracting circuit 330, and a quantizing circuit 340. The buffer circuit 320, the subtracting circuit 330, and the quantizing circuit 340 constitute an analog front end (AFE) for generating the luminance change signal.

The logarithmic converter circuit 310 includes a photoelectric conversion element 300, an N-channel MOS transistor 311, a P-channel MOS transistor 312, and an N-channel MOS transistor 313. The photoelectric conversion element 300 photoelectrically converts incident light and generates an amount of charge corresponding to the amount of incident light. The photoelectric conversion element 300 is configured with, for example, a photodiode. The photoelectric conversion element 300 is connected in series with a MOS transistor 514. The MOS transistor 312 is connected in series with the MOS transistor 313. Furthermore, the gate of the MOS transistor 311 is connected to the drain of the MOS transistor 312 and the drain of the MOS transistor 313. In the logarithmic converter circuit 310, charge photoelectrically converted in the photoelectric conversion element 300 is converted into a voltage signal Vlog of a logarithmic output.

The buffer circuit 320 includes a P-channel MOS transistor 321 and a P-channel MOS transistor 322. The MOS transistor 321 is connected in series with the MOS transistor 522. The buffer circuit 320 outputs a source follower voltage signal VSF that is obtained by impedance conversion on the voltage signal Vlog inputted to the gate of the MOS transistor 322.

The subtracting circuit 330 includes a P-channel MOS transistor 331, a P-channel MOS transistor 332, an N-channel MOS transistor 333, a capacitor 334, and a capacitor 335. The MOS transistor 332 is connected in series with the MOS transistor 333. The capacitor 334 is connected to the gate of the MOS transistor 332. The MOS transistor 331 and the capacitor 335 are connected in parallel between the gate and the drain of the MOS transistor 332. When the EVS pixel circuit 30 detects an event, the MOS transistor 331 is switched from an off-state to an on-state. Thus, the EVS pixel circuit 30 is placed in a reset state where an event is undetectable. After a lapse of a predetermined time, the MOS transistor 331 is switched from an off-state to an on-state, so that the EVS pixel circuit 30 is placed in a state where an event is detectable. The subtracting circuit 330 outputs a difference voltage signal Vdiff of the source follower voltage signal VSF before and after a reset.

The quantizing circuit 340 includes a P-channel MOS transistor 341, an N-channel MOS transistor 342, a P-channel MOS transistor 343, and an N-channel MOS transistor 344. The MOS transistor 341 is connected in series with the MOS transistor 342. The MOS transistor 543 is connected in series with the MOS transistor 344.

The MOS transistor 341 and the MOS transistor 342 constitute a first comparator circuit that compares the difference voltage signal Vdiff, which is inputted to the gate of the MOS transistor 341, with an upper-limit threshold value. The MOS transistor 343 and the MOS transistor 344 constitute a second comparator circuit that compares the difference voltage signal Vdiff, which is inputted to the gate of the MOS transistor 343, with a lower-limit threshold value. The output signals of the first comparator circuit and the second comparator circuit correspond to a digital luminance change signal. If the difference voltage signal Vdiff exceeds the upper-limit threshold value, the signal value of the luminance change signal is "+1." If the difference voltage signal Vdiff falls below the lower-limit threshold value, the signal value of the luminance change signal is "−1." If the difference voltage signal Vdiff is set between the upper-limit threshold value and the lower-limit threshold value, the signal value of the luminance change signal is "0."

The EVS pixel circuits 30 is not limited to the circuit in FIG. 3 if the circuit can detect a luminance change of incident light. For example, a flip-flop circuit that temporarily holds the luminance change signals of each row of the pixel array 21 may be disposed downstream of the quantizing circuit 340.

Figure 4:
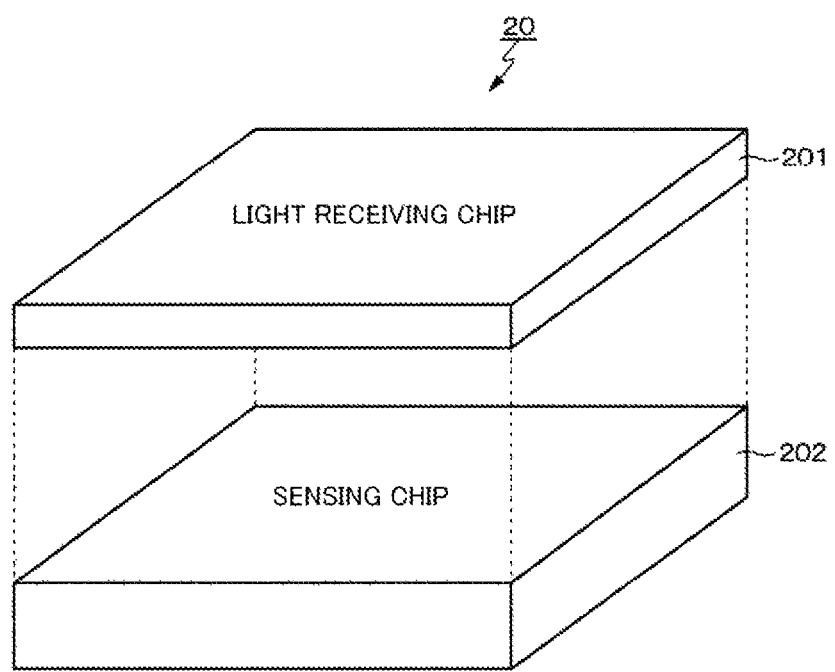
FIG. 4 is an exploded perspective view schematically illustrating the chip structure of the imaging device.

FIG. 4 is an exploded perspective view schematically illustrating the chip structure of the imaging device 20. As illustrated in FIG. 4, the imaging device 20 has a laminated structure including at least two chips: a light receiving chip 201 and a sensing chip 202. For example, in the EVS pixel circuit 30 in FIG. 3, the photoelectric conversion element 300 is disposed on the light receiving chip 201 while all the elements other than the photoelectric conversion element 300 and other elements of the imaging device 20 are disposed on the sensing chip 202. The light receiving chip 201 and the sensing chip 202 are electrically connected to each other with connecting parts such as a via (VIA), a Cu-Cu junction, and bumps. In other words, the light receiving chip 201 and the sensing chip 202 are bonded to each other according to any one of a CoC (Chip on Chip) method, a CoW (Chip on Wafer) method, and a WoW (Wafer on Wafer) method.

The chip layout is not limited to the layout of FIG. 4. For example, the pixel array 21 may be disposed on the light receiving chip 201 and other circuit elements may be disposed on the sensing chip 202. Alternatively, the pixel array 21, the access control circuit 22, and the reading circuit 24 may be disposed on the light receiving chip 201 and other circuit elements may be disposed on the sensing chip 202.

Figure 5:
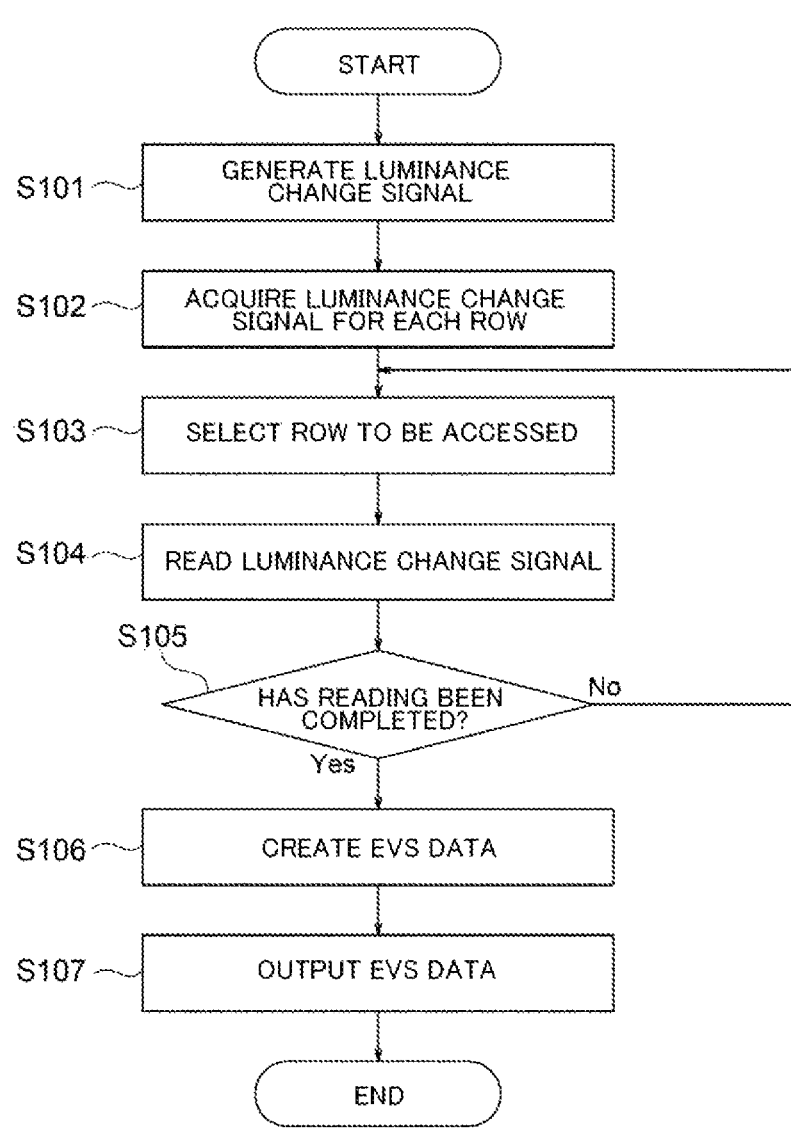
FIG. 5 is a flowchart showing the procedure of the light detecting operations of the imaging device.
Figure 6:
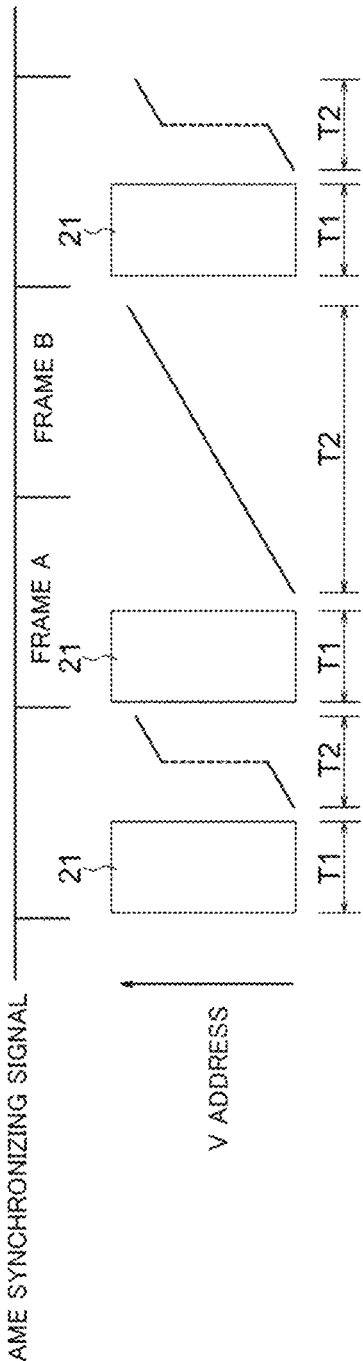
FIG. 6 is a timing chart of the light detecting operations of the imaging device.

Referring to FIGS. 5 and 6, the light detecting operations of the imaging device 20 configured thus will be described below.

FIG. 5 is a flowchart showing the procedure of the light detecting operations of the imaging device 20. FIG. 6 is a timing chart of the light detecting operations of the imaging device 20.

In the present embodiment, first, each of the EVS pixel circuits 30 of the pixel array 21 generates a luminance change signal in a detection reset period T1 of FIG. 6 (step S1). In other words, the EVS pixel circuit 30 detects whether the luminance of incident light has changed. The EVS pixel circuit 30 having detected a luminance change is reset.

Subsequently, the access control circuit 22 acquires luminance change signals for each row from the pixel array 21 (step S102). The access control circuit 22 then provides the acquired luminance change signals to the timing control circuit 23 and the time stamp generating circuit 26. Thus, the timing control circuit 23 is notified of all detection pixel rows having detected luminance changes of incident light in the pixel array 21. Moreover, the time stamp generating circuit 26 generates a time stamp on the basis of the luminance change signal.

The timing control circuit 23 then selects the rows to be accessed by the access control circuit 22 in the pixel array 21 on the basis of the signal value of the luminance change signal (step S103). In step S103, the timing control circuit 23 specifies, as detected pixel rows, the rows including the luminance change signal having a signal value of "+1" or "−1" and selects all the specified rows as access rows. Furthermore, the timing control circuit 23 notifies the EVS signal processing unit 25 of the number of selected detection pixel rows.

Thereafter, when the access control circuit 22 accesses the detection pixel row selected by the timing control circuit 23, the reading circuit 24 reads the luminance change signals of the detection pixel row in a reading period T2 in FIG. 6 (step S104). In step S104, if the number of detection pixel rows is small, the reading circuit 24 can read the luminance change signals of all the detection pixel rows in one frame. If the number of detection pixel rows is large, however, it is difficult to read the luminance change signals of all the detection pixel rows in one frame. Thus, in this case, the reading circuit 24 reads luminance change signals across a plurality of consecutive frames (frame A, frame B).

Figure 7:
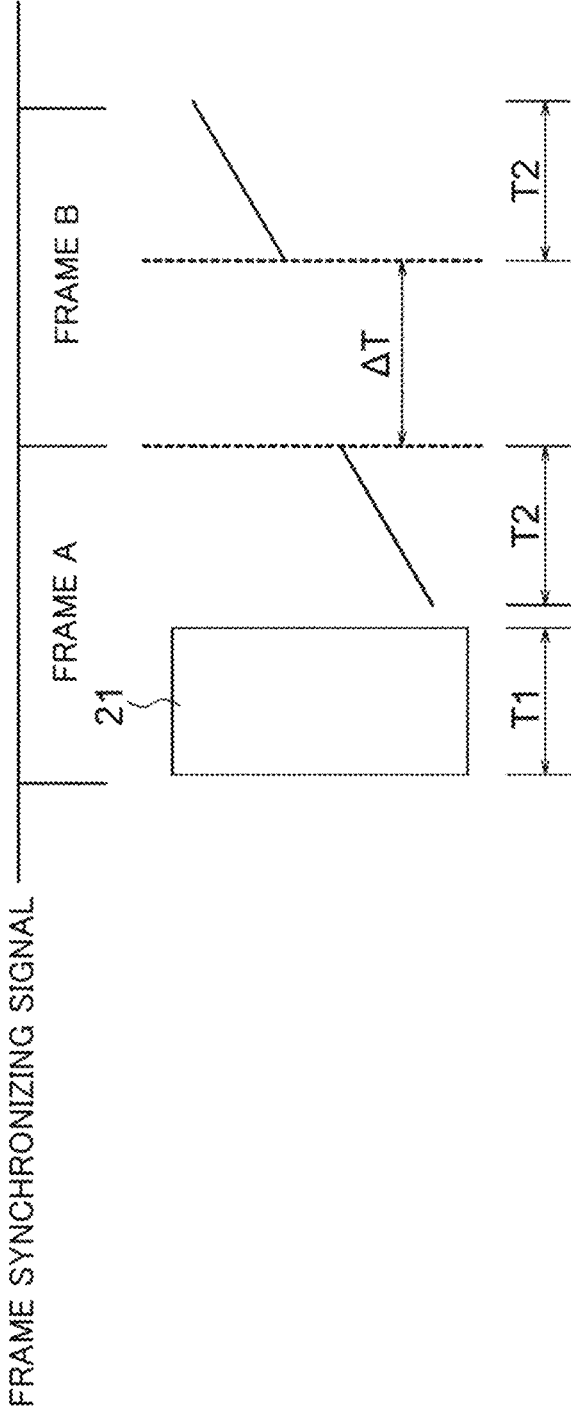
FIG. 7 is another timing chart of the reading operation of a reading circuit.

FIG. 7 is another timing chart of the reading operation of the reading circuit 24. As shown in FIG. 7, when the reading circuit 24 reads luminance change signals from a plurality of frames, an interval ΔT may be provided at the boundary between the frames. The length of the interval ΔT can be set according to, for example, the length of the detection reset period T1. This uniformly sets the reading period T2 in each frame.

The reading circuit 24 sequentially outputs the read luminance change signals of the detection pixel rows from the pixel array 21 to the EVS signal processing unit 25. The EVS signal processing unit 25 determines whether the reading operation of the reading circuit 24 has been completed or not by comparing the number of luminance change signals inputted from the reading circuit 24 with the number of detection pixel rows notified from the timing control circuit 23 in step S103 (step S105).

At the completion of the reading operation of the reading circuit 24, the EVS signal processing unit 25 creates EVS data on the basis of the luminance change signals (step S106). The output interface 27 then outputs the EVS data generated by the EVS signal processing unit 25 (step S107). Thereafter, the operations of steps S101 to S107 are repeated.

Figure 8:
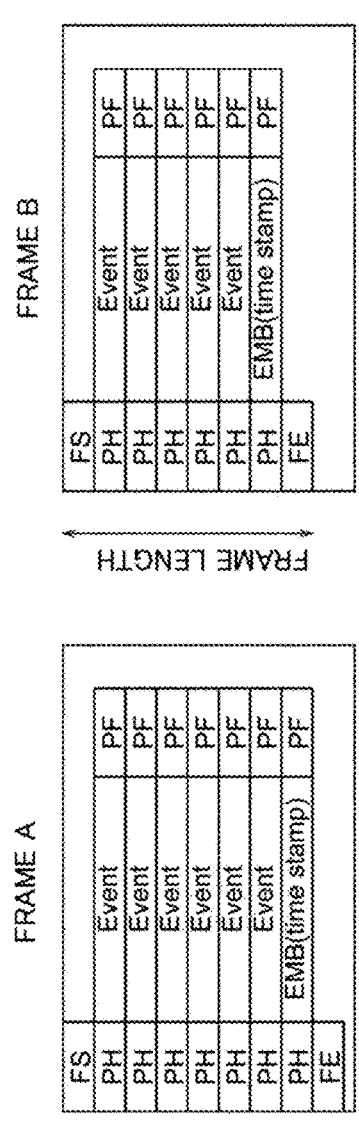
FIG. 8 shows a structural example of EVS data according to the first embodiment.

FIG. 8 shows a structural example of EVS data according to the first embodiment. The EVS signal processing unit 25 creates EVS data for each frame. At the head of the EVS data, a frame start (FS) is embedded. At the tail of the EVS data, a frame end (FE) is embedded. Between the frame start (FS) and the frame end (FE), event data (Event) and a time stamp are embedded. The event data is related to the luminance change signals of each detection pixel row, and the time stamp indicates that a luminance change of incident light is detected. If the reading circuit 24 reads luminance change signals from the frames A and B, the time stamp embedded in the EVS data of the frame A is identical to the time stamp embedded in the EVS data of the frame B.

A packet header (PH) and a packet footer (PF) are respectively embedded at the head and tail of the event data. Thus, the event data can be identified when the EVS data is read. Moreover, the address of the detection pixel row is embedded at the head of the event data. This can locate the detection pixel row in the pixel array 21.

In the EVS data, a frame length corresponds to the number of pieces of event data. The number of pieces of event data changes according to the number of detection pixel rows. Thus, the frame length of EVS data may be different for each frame. For example, in FIG. 8, the number of detection pixel rows in the frame A is larger than the number of detection pixel rows in the frame B. Thus, the frame length of the EVS data of the frame A is longer than that of the EVS data of the frame B. In this way, in the present embodiment, the frame length of the EVS data is variable according to the number of detection pixel rows.

According to the present embodiment, from the pixel array 21, the reading circuit 24 only reads the luminance change signals of the detection pixel row including the EVS pixel circuits 30 having detected events. This obtains a shorter reading time as compared with the reading of the luminance change signals of all rows from the pixel array 21. Thus, the EVS data can be outputted at high speeds.

Second Embodiment

Figure 9:
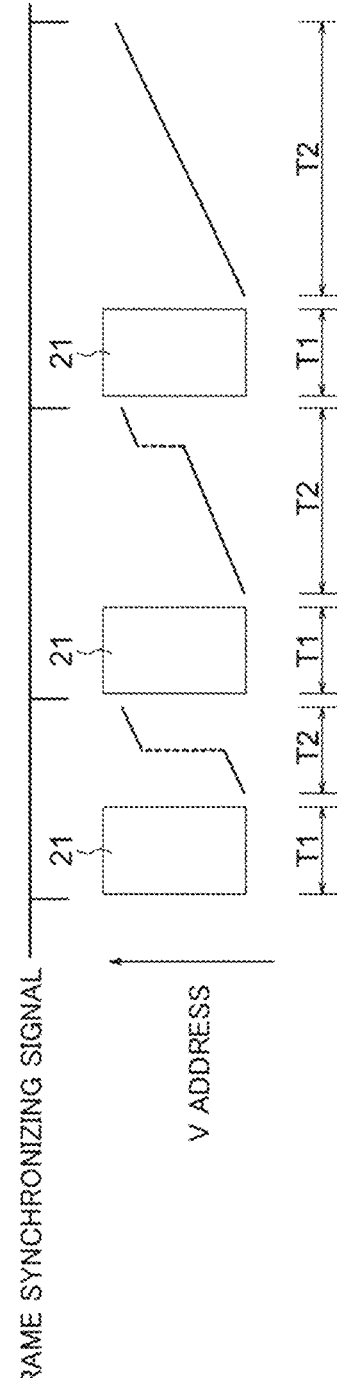
FIG. 9 is a timing chart showing the timing for transmitting a frame synchronizing signal according to a second embodiment.

A second embodiment will be described below. The second embodiment is different from the first embodiment in the timing for transmitting a frame synchronizing signal. Referring to FIG. 9, the timing for transmitting the frame synchronizing signal in the second embodiment will be described below. In the present embodiment, the configuration of an imaging device 20 is identical to that of the first embodiment. Hence, the constituent elements of the imaging device 20 are indicated by the same reference numerals, and a detailed description thereof is omitted.

FIG. 9 is a timing chart showing the timing for transmitting the frame synchronizing signal according to the second embodiment. In the present embodiment, as shown in FIG. 9, a timing control circuit 23 transmits the frame synchronizing signal in synchronization with the timing of the end of a reading period T2. Thus, the period of the frame synchronizing signal is extended as the number of detection pixel rows increases, whereas the period of the frame synchronizing signal is shortened as the number of detection pixel rows decreases. In this way, the period of the frame synchronizing signal is variable according to the number of detection pixel rows.

Moreover, in the present embodiment, an EVS signal processing unit 25 recognizes the completion of the reading operation of a reading circuit 24 on the basis of the frame synchronizing signal. Thus, the EVS signal processing unit 25 starts creating EVS data in response to the frame synchronizing signal serving as a trigger.

According to the present embodiment, as in the first embodiment, the reading circuit 24 only reads the luminance change signals of the detection pixel row, so that the EVS data can be outputted at high speeds. In the present embodiment, the timing control circuit 23 transmits the frame synchronizing signal at the completion of the reading of the luminance change signal by the reading circuit 24. Thus, the EVS signal processing unit 25 can create EVS data without being notified of the number of detection pixel rows from the timing control circuit 23. This can reduce a load for providing a notification by the timing control circuit 23.

Third Embodiment

Figure 10:
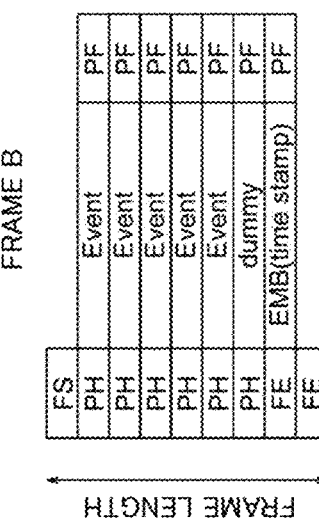
FIG. 10 shows a structural example of EVS data according to a third embodiment.

A third embodiment will be described below. The third embodiment is different from the first embodiment in the structure of EVS data. Referring to FIG. 10, the structure of EVS data according to the third embodiment will be described below. Also in the present embodiment, the configuration of an imaging device 20 is identical to that of the first embodiment. Hence, the constituent elements of the imaging device 20 are indicated by the same reference numerals, and a detailed description thereof is omitted.

FIG. 10 shows a structural example of EVS data according to the third embodiment. In the present embodiment, if the number of detection pixel rows varies among frames, an EVS signal processing unit 25 embeds dummy data in EVS data having a small number of detection pixel rows.

For example, the EVS data of a frame A in FIG. 10 includes six pieces of event data. The EVS data of a frame B includes five pieces of event data. In this case, the EVS signal processing unit 25 embeds a piece of dummy data in the EVS data of the frame B. Consequently, the frame length of the EVS data of the frame B is equal to that of the EVS data of the frame A. Thereafter, an output interface 27 outputs the EVS data of each frame.

According to the present embodiment, as in the first embodiment, a reading circuit 24 only reads the luminance change signals of a detection pixel row, so that the EVS data can be outputted at high speeds. Furthermore, in the present embodiment, the EVS signal processing unit 25 embeds at least one piece of dummy data in the EVS data according to the number of detection pixel rows. Thus, the number of pieces of data in each frame, that is, a frame length can be uniform. This can fix the frame length of the EVS data regardless of the number of detection pixel rows.

Fourth Embodiment

A fourth embodiment will be described below. The fourth embodiment is different from the third embodiment in the structure of EVS data. Referring to FIG. 11, the structure of EVS data according to the fourth embodiment will be described below. Also in the present embodiment, the configuration of an imaging device 20 is identical to that of the first embodiment. Hence, the constituent elements of the imaging device 20 are indicated by the same reference numerals, and a detailed description thereof is omitted.

FIG. 11 shows a structural example of EVS data according to the fourth embodiment. In the present embodiment, as in the third embodiment, if the number of detection pixel rows varies among frames, an EVS signal processing unit 25 embeds dummy data in EVS data having a small number of detection pixel rows.

Moreover, in the present embodiment, the EVS signal processing unit 25 combines the EVS data of multiple frames into a piece of EVS data in order to fix a frame rate that is an update rate of EVS data.

For example, in FIG. 11, the EVS signal processing unit 25 combines the EVS data of four frames A, B, C, and D. At this point, a frame start (FS) is embedded only in the EVS data of the leading frame A and is not embedded in the EVS data of other frames. Moreover, a frame end (FE) is embedded only in the EVS data of the last frame D and is not embedded in the EVS data of other frames.

If a frame rate is fixed, EVS data cannot be embedded in the last frame D so as to extend over the multiple frames. Thus, the EVS data of the last frame D does not include event data but only includes dummy data.

According to the present embodiment, as in the first embodiment, a reading circuit 24 only reads the luminance change signals of a detection pixel row, so that the EVS data can be outputted at high speeds. Furthermore, in the present embodiment, a frame rate can be fixed regardless of the number of detection pixel rows by combining the EVS data of the multiple frames.

Fifth Embodiment

Figure 12:
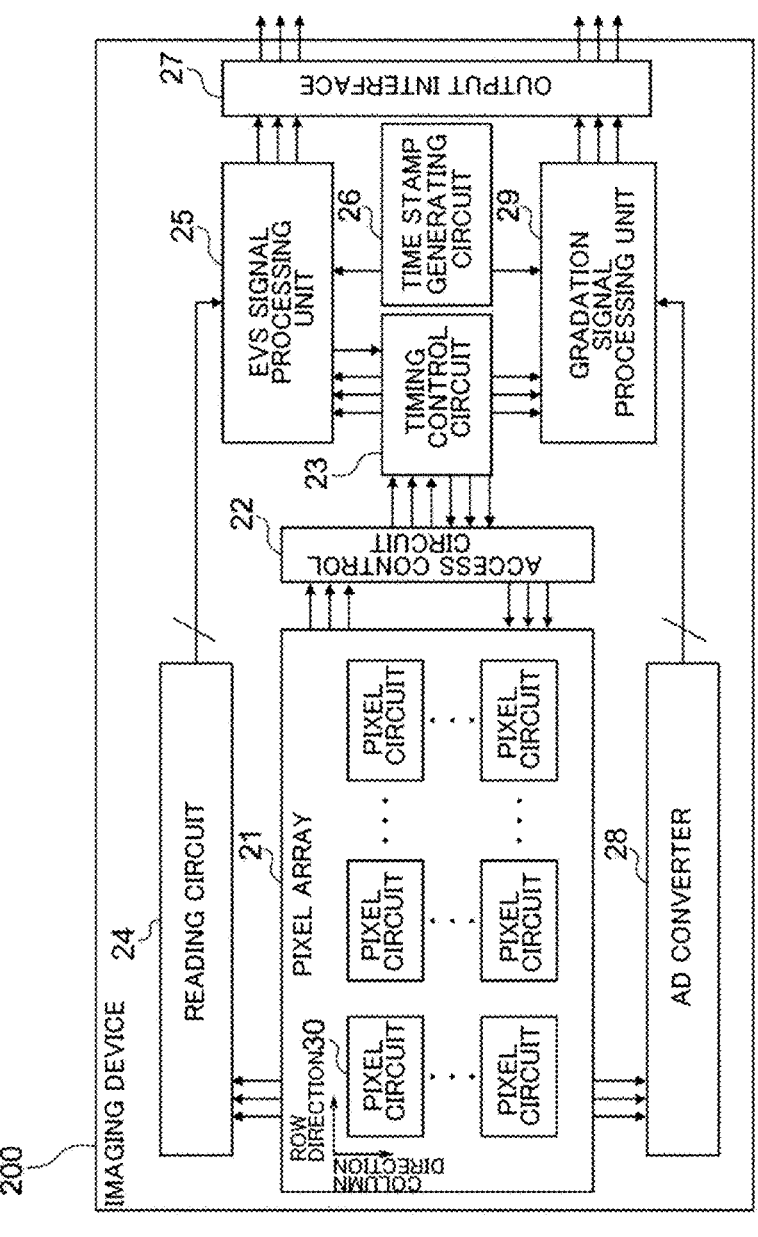
FIG. 12 is a block diagram illustrating the configuration of an imaging device according to a fifth embodiment.

FIG. 12 is a block diagram illustrating the configuration of an imaging device according to a fifth embodiment. In FIG. 12, the same constituent elements as those of the first embodiment are indicated by the same reference numerals, and detailed descriptions thereof are omitted.

An imaging device 200 of the present embodiment further includes an AD converter 28 and a gradation signal processing unit 29 in addition to the constituent elements of the imaging device 20 according to the first embodiment. The configuration of a pixel circuit 40 in a pixel array 21 is different from the configuration of the EVS pixel circuit 30 according to the first embodiment. The configuration of the pixel circuit 40 will be first described below.

Figure 13:
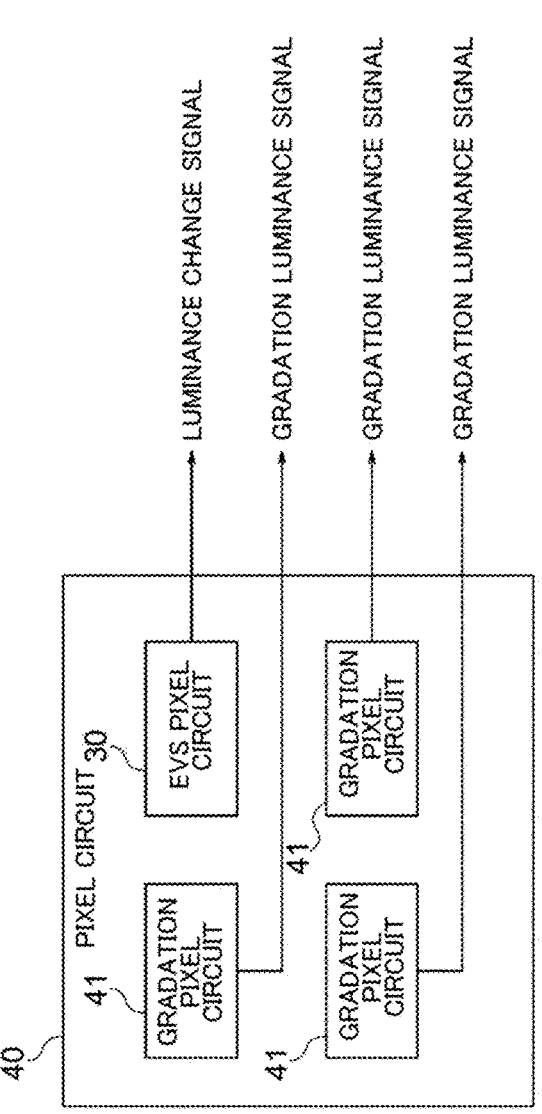
FIG. 13 illustrates the configuration of a pixel circuit according to the fifth embodiment.

FIG. 13 illustrates the configuration of the pixel circuit 40 according to the fifth embodiment. The pixel circuit 40 in FIG. 13 further includes three gradation pixel circuits 41 (second pixel circuits) in addition to the EVS pixel circuit 30 described in the first embodiment. For example, the three gradation pixel circuits 41 photoelectrically convert red light (R), green light (G), and blue light (B), respectively, and output a gradation luminance signal (second signal) according to the amount of charge. The number of gradation pixel circuits 41 is not particularly limited and may be at least one.

Figure 14:
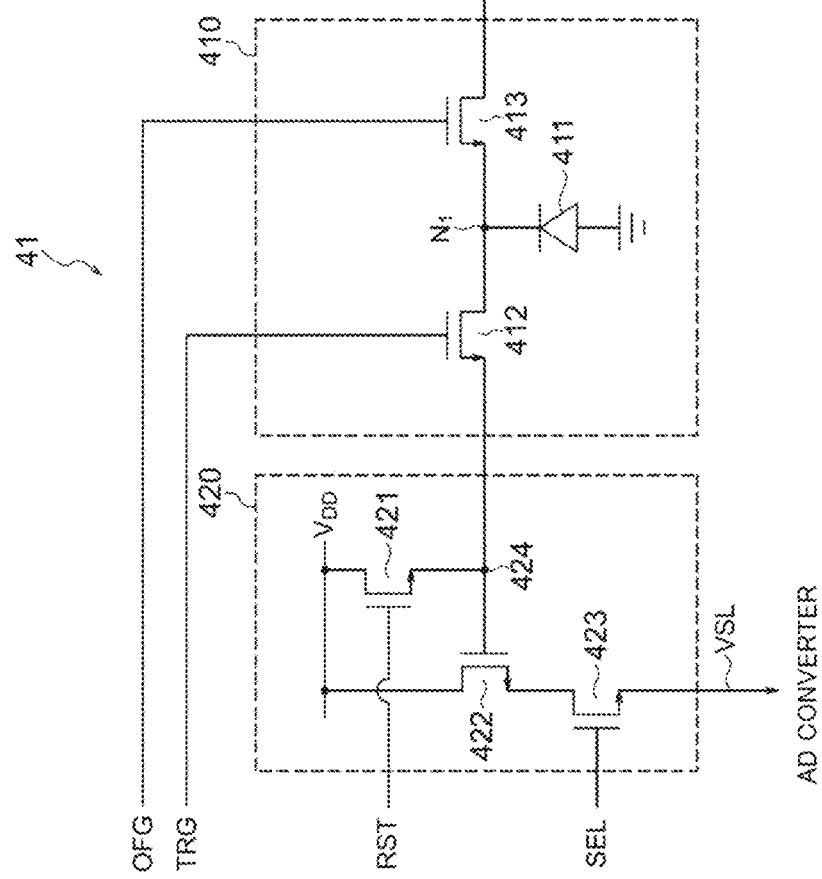
FIG. 14 illustrates a configuration example of a gradation pixel circuit.

FIG. 14 illustrates a configuration example of the gradation pixel circuit 41. The gradation pixel circuit 41 in FIG. 14 includes a photoelectric conversion unit 410 and a signal generation unit 420.

The photoelectric conversion unit 410 includes a photoelectric conversion element 411, a transfer transistor 412, and an OFG (Over Flow Gate) transistor 413. For the transfer transistor 412 and the OFG transistor 413, for example, N-channel MOS (Metal Oxide Semiconductor) transistors are used. The transfer transistor 412 and the OFG transistor 413 are connected in series.

The photoelectric conversion element 411 is connected between a common connection node N1 of the transfer transistor 412 and the OFG transistor 413 and the ground. The photoelectric conversion element 411 photoelectrically converts incident light and generates an amount of charge corresponding to the amount of the incident light. The photoelectric conversion element 411 is configured with, for example, a photodiode.

A transfer signal TRG is supplied to the gate electrode of the transfer transistor 412 from the access control circuit 22 (see FIG. 2). In response to the transfer signal TRG, the transfer transistor 412 supplies charge photoelectrically converted by the photoelectric conversion element 411, to the signal generation unit 420.

A control signal OFG is supplied to the gate electrode of the OFG transistor 413 from the access control circuit 22. In response to the control signal OFG, the OFG transistor 413 releases a charge remaining in the photoelectric conversion element 411.

The signal generation unit 420 includes a reset transistor 421, an amplification transistor 422, a selection transistor 423, and a floating diffusion layer 424. For the reset transistor 421, the amplification transistor 422, and the selection transistor 423, for example, N-channel MOS transistors are used.

A charge photoelectrically converted by the photoelectric conversion element 411 is supplied to the signal generation unit 420 from the photoelectric conversion unit 410 by the transfer transistor 412. The charge supplied from the photoelectric conversion unit 410 is stored in the floating diffusion layer 424. The floating diffusion layer 424 generates a voltage signal having a voltage value corresponding to the amount of stored charge. In other words, the floating diffusion layer 424 converts a charge into a voltage.

The reset transistor 421 is connected between the power supply line of a power supply voltage VDD and the floating diffusion layer 424. A reset signal RST is supplied to the gate electrode of the reset transistor 421 from the access control circuit 22. The reset transistor 421 initializes (resets) the amount of charge of the floating diffusion layer 424 in response to the reset signal RST.

The amplification transistor 422 is connected in series with the selection transistor 423 between the power supply line of the power supply voltage VDD and a vertical signal line VSL. The amplification transistor 422 amplifies a voltage signal having been subjected to charge/voltage conversion in the floating diffusion layer 424.

A selection signal SEL is supplied to the gate electrode of the selection transistor 423 from the access control circuit 22. In response to the selection signal SEL, the selection transistor 423 outputs the voltage signal, which is amplified by the amplification transistor 422, as a gradation luminance signal to the AD converter 28 through the vertical signal line VSL.

The foregoing configuration of the gradation pixel circuit 41 is merely exemplary and is not limited to the configuration example. For example, the gradation pixel circuit 41 may be configured like a ToF (Time of Flight) pixel circuit that measures a distance to an object on the basis of a time from the irradiation of light on the object to the reception of reflected light. In this case, for example, an SPAD (Single Photon Avalanche Diode) can be used for the photoelectric conversion element 411.

Returning to FIG. 12, for each pixel column of the pixel array 21, the AD converter 28 converts analog gradation luminance signals outputted from the gradation pixel circuits 41 of each column into digital signals. The AD converter 28 then outputs the digital signals to the gradation signal processing unit 29. The method of reading the gradation luminance signals from the pixel array 21 is not particularly limited and may be a global shutter method in which the charges of all pixels are stored with the same timing or a rolling shutter method in which the timing for storing charge is shifted for each pixel row.

The gradation signal processing unit 29 performs predetermined signal processing such as CDS (Correlated Double Sampling) and image recognition on the digital signals obtained from the AD converter 28. The gradation signal processing unit 29 then outputs gradation data on the processing result to the output interface 27. The output interface 27 outputs the gradation data at the same time as the EVS data created by the EVS signal processing unit 25.

Figure 15:
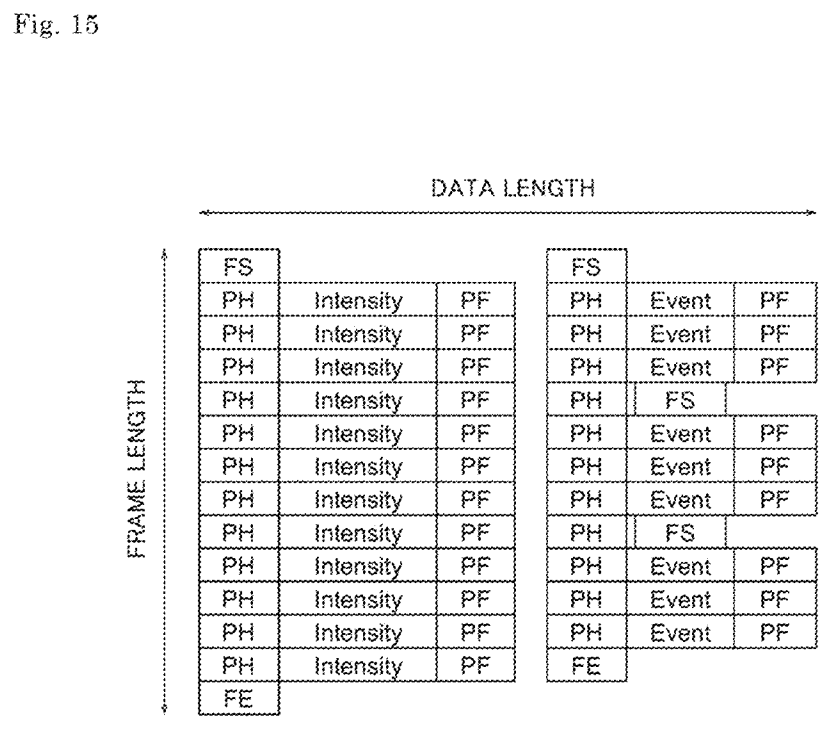

FIG. 15 shows an example of the output format of EVS data and gradation data. At the head of the gradation data created by the gradation signal processing unit 29, a frame start (FS) is embedded as in the EVS data. At the tail of the gradation data, a frame end (FE) is embedded. Between the frame start (FS) and the frame end (FE), luminance data (Intensity) related to the gradation luminance signal is embedded.

The output interface 27 simultaneously outputs the EVS data and the gradation data by using different virtual channels. Thus, the EVS data of each frame is separated by the frame start (FS) and the frame end (FE). The output format of the EVS data and the gradation data is not limited to the example of FIG. 15.

Figure 16:
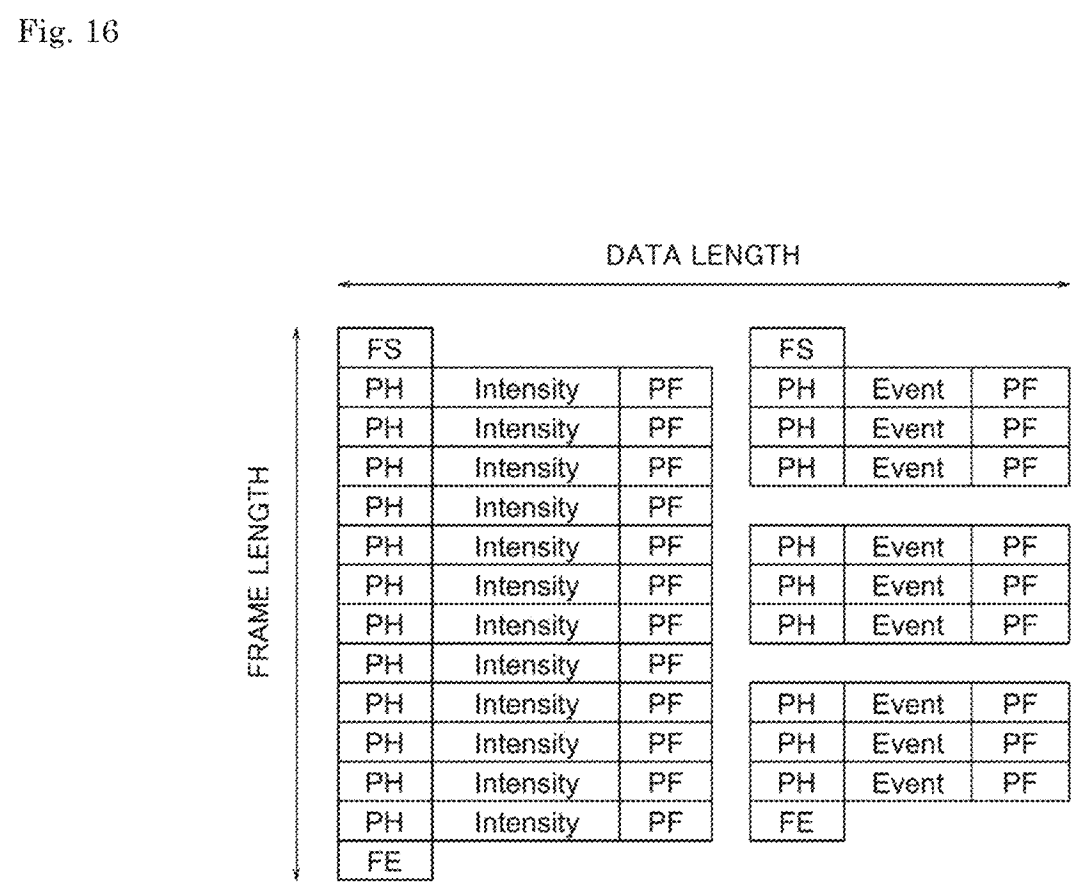

FIG. 16 shows another example of the output format of the EVS data and the gradation data. Since the frame rate of the EVS data is larger than that of the gradation data, the number of pieces of event data and the number of pieces of luminance data are different from each other in each frame. Thus, in the EVS data of FIG. 16, pieces of EVS data in multiple frames are combined to be equivalent to the super frame of the gradation data. Thus, the frame start (FS) is embedded only in the EVS data of the leading frame and is not embedded in the EVS data of other frames. Moreover, the frame end (FE) is embedded only in the EVS data of the last frame and is not embedded in the EVS data of other frames.

FIG. 17 shows still another example of the output format of the EVS data and the gradation data. In the example of FIG. 17, luminance data and event data are continuously embedded in the same data row. At the head of a data set including the luminance data and the event data, a packet header (PH) is embedded and a packet footer (PF) is embedded at the termination of the data set. If the number of pieces of event data is smaller than that of luminance data, dummy data may be embedded in the data set. In this case, the number of pieces of EVS data and the number of pieces of gradation data can be equal to each other.

Figure 18:
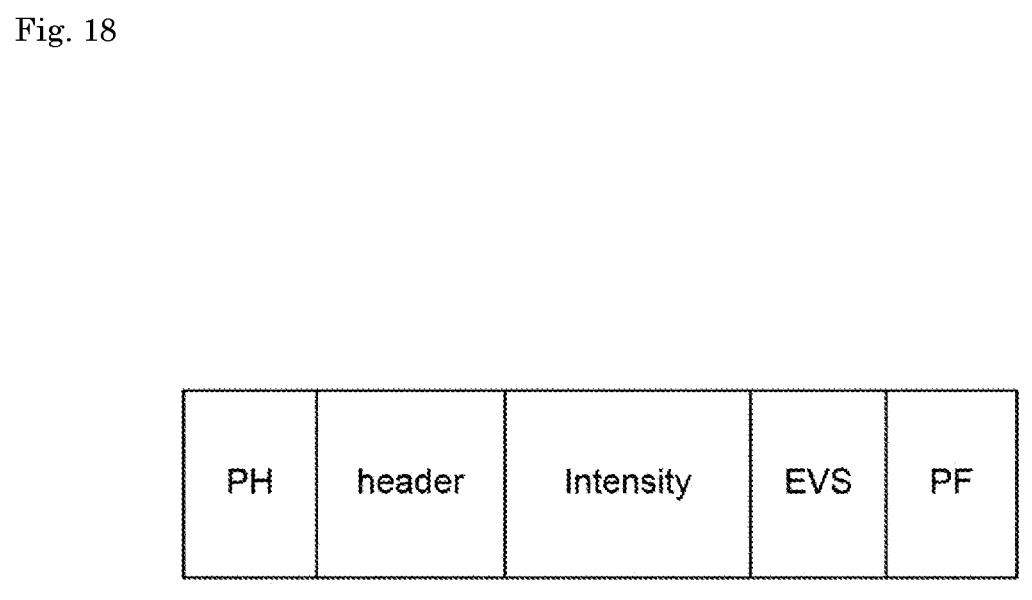

FIG. 18 shows is an example of the structure of a data set including luminance data and event data. In the data set of FIG. 18, a data header is embedded at the head of the luminance data. The data header indicates the area of the luminance data and the area of the event data. Thus, the luminance data and the event data can be distinguished from each other when the data set is read.

Figure 19:
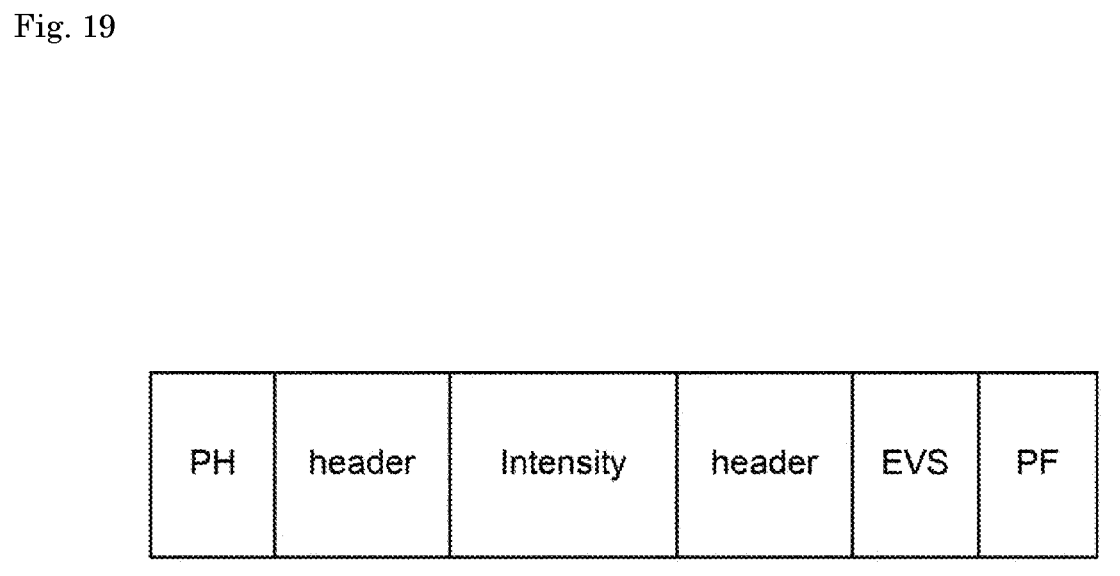

FIG. 19 shows is an example of the structure of a data set including luminance data and event data. In the data set of FIG. 19, a data header is embedded at each of the head of the luminance data and the head of the event data. The data header embedded at the head of the luminance data indicates the area of the luminance data. The data header embedded at the head of the event data indicates the area of the event data. Also in this case, the luminance data and the event data can be distinguished from each other when the data set is read.

According to the present embodiment, as in the first embodiment, a reading circuit 24 only reads the luminance change signals of a detection pixel row, so that the EVS data can be outputted at high speeds. Furthermore, in the present embodiment, the gradation data indicating the luminance value of an object to be imaged can be obtained in addition to the EVS data indicating the presence or absence of a detected event.

<Application to Mobile Object>

The technique of the present disclosure (the present technique) can be applied to various products. For example, the technique according to the present disclosure may be realized as a device mounted on any type of mobile objects such as an automobile, an electric automobile, a hybrid electric automobile, a motorcycle, a bicycle, a personal mobility device, an airplane, a drone, a ship, and a robot.

Figure 20:
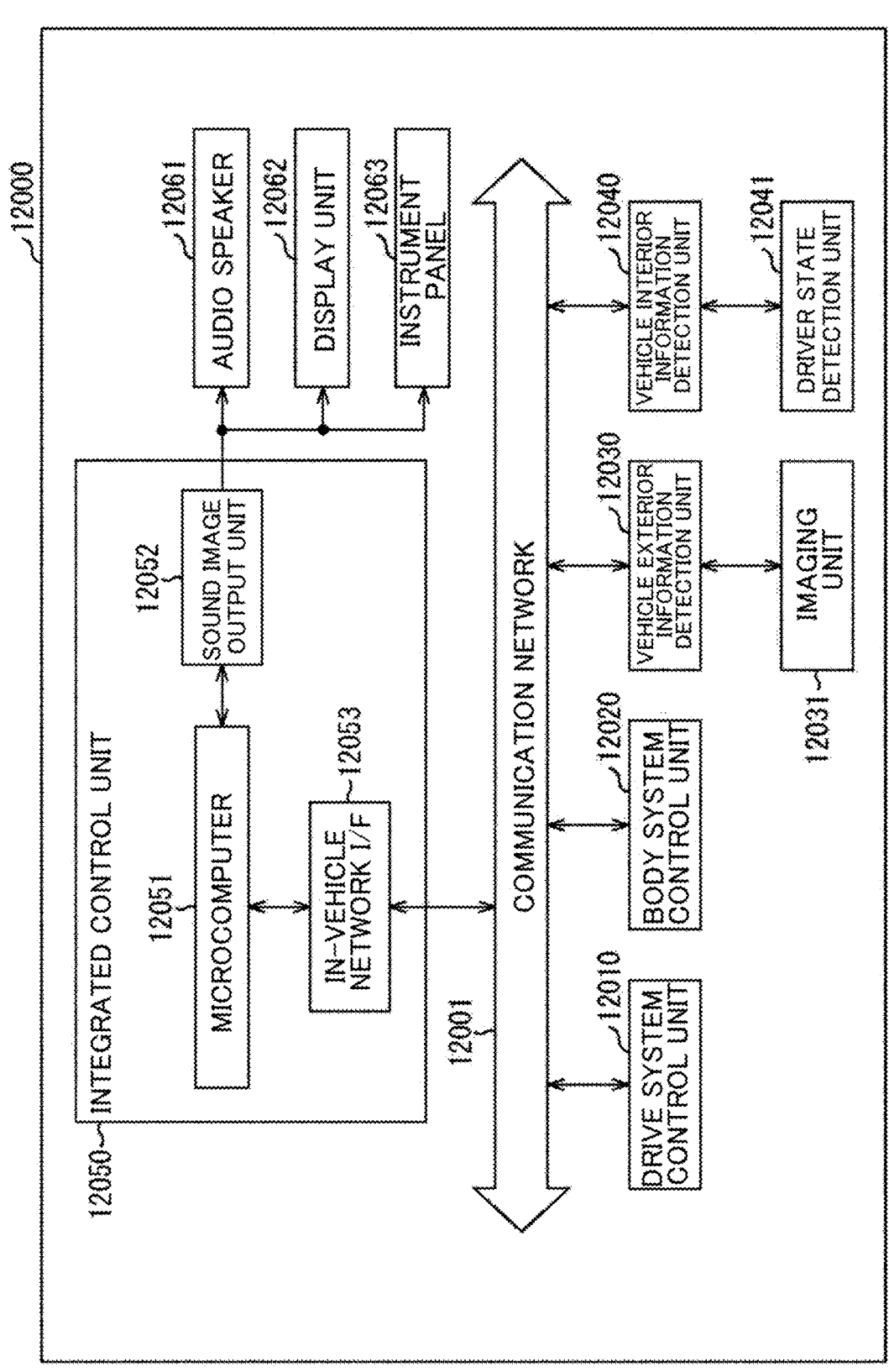
FIG. 20 is a block diagram illustrating an example of a schematic configuration of a vehicle control system.

FIG. 20 is a block diagram illustrating a schematic configuration example of a vehicle control system which is an example of a mobile object control system to which the technique according to the present disclosure is applicable.

A vehicle control system 12000 includes a plurality of electronic control units connected via a communication network 12001. In the example illustrated in FIG. 20, the vehicle control system 12000 includes a drive system control unit 12010, a body system control unit 12020, a vehicle exterior information detection unit 12030, a vehicle interior information detection unit 12040, and an integrated control unit 12050. In addition, as the functional configuration of the integrated control unit 12050, a microcomputer 12051, a sound image output unit 12052, and an in-vehicle network I/F (Interface) 12053 are illustrated.

The drive system control unit 12010 controls an operation of an apparatus related to a drive system of a vehicle according to various programs. For example, the drive system control unit 12010 functions as a control device for a driving force generation device that generates a vehicle driving force of an internal combustion engine, a driving motor, or the like, a driving force transmission mechanism that transmits a driving force to wheels, a steering mechanism that adjusts a steering angle of a vehicle, and a braking device that generates a braking force of a vehicle.

The body system control unit 12020 controls operations of various devices mounted in the vehicle body according to various programs. For example, the body system control unit 12020 functions as a control device for a keyless entry system, a smart key system, a power window device, or various lamps such as a headlamp, a back lamp, a brake lamp, a turn signal, and a fog lamp. In this case, radio waves transmitted from a portable device that substitutes for a key or signals of various switches may be inputted to the body system control unit 12020. The body system control unit 12020 receives inputs of the radio waves or signals and controls a door lock device, a power window device, and the lamps of the vehicle.

The vehicle exterior information detection unit 12030 detects information on the outside of the vehicle having the vehicle control system 12000 mounted therein. For example, an imaging unit 12031 is connected to the vehicle exterior information detection unit 12030. The vehicle exterior information detection unit 12030 causes the imaging unit 12031 to capture an image of the outside of the vehicle and receives the captured image. The vehicle exterior information detection unit 12030 may perform object detection processing or distance detection processing on persons, cars, obstacles, signs, and letters on the road on the basis of the received image.

The imaging unit 12031 is an optical sensor that receives light and outputs an electrical signal according to the amount of the received light. The imaging unit 12031 can also output the electrical signal as an image or distance measurement information. In addition, the light received by the imaging unit 12031 may be visible light or invisible light such as infrared light.

The vehicle interior information detection unit 12040 detects information on the inside of the vehicle. For example, a driver state detection unit 12041 that detects a driver's state is connected to the vehicle interior information detection unit 12040. The driver state detection unit 12041 includes, for example, a camera that captures an image of a driver, and the vehicle interior information detection unit 12040 may calculate a degree of fatigue or concentration of the driver or may determine whether or not the driver is dozing on the basis of detection information inputted from the driver state detection unit 12041.

The microcomputer 12051 can calculate control target values for the driving force generation device, the steering mechanism, or the braking device on the basis of information on the inside and outside of the vehicle, the information being acquired by the vehicle exterior information detection unit 12030 or the vehicle interior information detection unit 12040, and the microcomputer 12051 can output control commands to the drive system control unit 12010. For example, the microcomputer 12051 can perform cooperative control for the purpose of implementing functions of an ADAS (Advanced Driver Assistance System) including vehicle collision avoidance, impact mitigation, following traveling based on an inter-vehicle distance, vehicle speed maintenance driving, vehicle collision warning, and vehicle lane deviation warning.

Furthermore, the microcomputer 12051 can perform cooperative control for the purpose of automated driving or the like in which automated driving is performed without depending on operations by the driver, by controlling the driving force generator, the steering mechanism, or the braking device and the like on the basis of information about the surroundings of the vehicle, the information being acquired by the vehicle exterior information detection unit 12030 or the vehicle interior information detection unit 12040.

In addition, the microcomputer 12051 can output a control command to the body system control unit 12030 on the basis of the information on the outside of the vehicle, the information being acquired by the vehicle exterior information detection unit 12030. For example, the microcomputer 12051 can perform coordinated control for the purpose of antiglare, for example, switching of a high beam to a low beam by controlling a headlamp according to a position of a vehicle ahead or an oncoming vehicle detected by the vehicle exterior information detection unit 12030.

The sound image output unit 12052 transmits an output signal of at least one of a sound and an image to an output device capable of providing a notification of visual or auditory information to a passenger of the vehicle or the outside of the vehicle. In the example of FIG. 20, an audio speaker 12061, a display unit 12062, and an instrument panel 12063 are exemplified as output devices. The display unit 12062 may include, for example, at least one of an onboard display and a head-up display.

Figure 21:
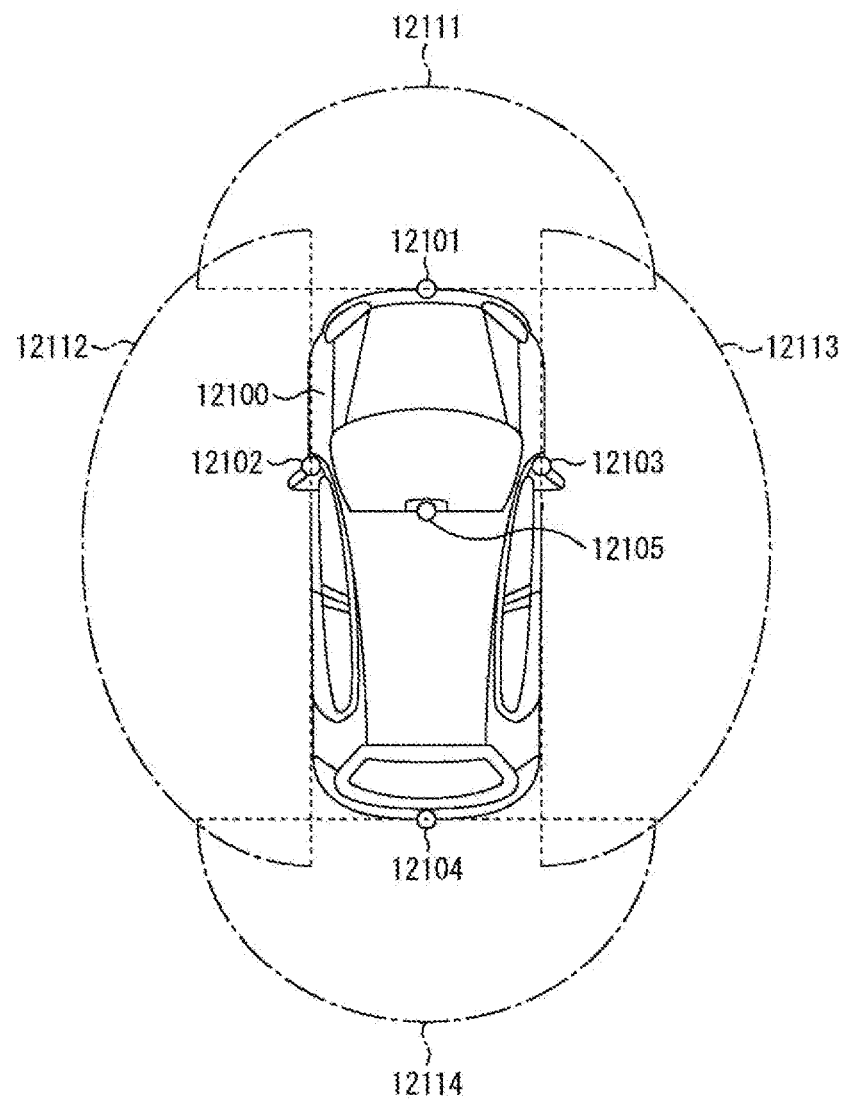
FIG. 21 is an explanatory drawing illustrating an example of the installation positions of a vehicle exterior information detection unit and imaging units.

FIG. 21 is a diagram showing an example of an installation position of the imaging unit 12031.

In FIG. 21, the imaging unit 12031 includes imaging units 12101, 12102, 12103, 12104, and 12105.

The imaging units 12101, 12102, 12103, 12104, and 12105 are provided at, for example, the positions of a front nose, side mirrors, a rear bumper, a back door, an internal upper portion of the front windshield of the vehicle 12100. The imaging unit 12101 provided at the front nose and the imaging unit 12105 provided at the internal upper portion of the front windshield mainly acquire images ahead of the vehicle 12100. The imaging units 12102 and 12103 provided in the side mirrors mainly acquire images on the sides of the vehicle 12100. The imaging unit 12104 provided in the rear bumper or the back door mainly acquires an image behind the vehicle 12100. The imaging unit 12105 provided in the internal upper portion of the front windshield is mainly used to detect a vehicle ahead, a pedestrian, an obstacle, a traffic signal, a traffic sign, or a lane.

FIG. 21 illustrates an example of the imaging ranges of the imaging units 12101 to 12104. An imaging range 12111 indicates the imaging range of the imaging unit 12101 provided at the front nose, an imaging range 1211212113 indicating the imaging ranges of the imaging units 12102 and 12103 provided at the side mirrors, and an imaging range 12114 indicates the imaging range of the imaging unit 12104 provided at the rear bumper or the back door. For example, a bird's-eye view image of the vehicle 12100 as viewed from above can be obtained by superimposing pieces of image data captured by the imaging units 12101 to 12104.

At least one of the imaging units 12101 to 12104 may have the function of obtaining distance information. For example, at least one of the imaging units 12101 to 12104 may be a stereo camera including a plurality of imaging elements or may be an imaging element that has pixels for phase difference detection.

For example, the microcomputer 12051 can extract, in particular, a closest three-dimensional object that is located on a traveling path of the vehicle 12100 and travels at a predetermined speed (for example, 0 km/h or higher) in the substantially same direction as the vehicle 12100, as a vehicle ahead of the vehicle 12100 by acquiring a distance to each three-dimensional object in the imaging ranges 12111 to 12114 and a temporal change within the distance (a relative speed with respect to the vehicle 12100) on the basis of distance information obtained from the imaging units 12101 to 12104. The microcomputer 12051 can also set an inter-vehicle distance to be secured from the vehicle ahead and perform automatic brake control (including following stop control) and automatic acceleration control (including following start control). Thus, cooperative control can be performed for the purpose of, for example, automated driving in which the vehicle travels in an automated manner without depending on operations by the driver.

For example, the microcomputer 12051 can extract three-dimensional object data about three-dimensional objects after classifying the data into two-wheeled vehicles, normal vehicles, large vehicles, pedestrians, and other three-dimensional objects such as electric poles based on distance information obtained from the imaging units 12101 to 12104, and use the three-dimensional object data for automated avoidance of obstacles. For example, the microcomputer 12051 classifies obstacles around the vehicle 12100 into obstacles visually identifiable by the driver of the vehicle 12100 and obstacles that are difficult to visually identify. The microcomputer 12051 then determines a collision risk indicating the degree of risk of collision with each obstacle. If a collision is likely to occur while the collision risk is equal to or higher than a set value, an alarm is outputted to the driver through the audio speaker 12061 or the display unit 12062 or forced deceleration or avoidance steering is performed through the drive system control unit 12010, thereby providing driver assistance for collision avoidance.

At least one of the imaging units 12101 to 12104 may be an infrared camera that detects infrared rays. For example, the microcomputer 12051 can recognize a pedestrian by determining the presence or absence of a pedestrian in the captured image of the imaging units 12101 to 12104. A pedestrian is recognized by, for example, a procedure to extract feature points in the captured images of the imaging units 12101 to 12104 that are infrared cameras and a procedure to determine whether an object is a pedestrian by performing pattern matching on a series of feature points indicating an outline of the object. When the microcomputer 12051 determines that a pedestrian is present in the captured images of the imaging unit 12101 to 12104 and recognizes the pedestrian, the sound image output unit 12052 controls the display unit 12062 such that a square border line for emphasis is superimposed on the recognized pedestrian. Moreover, the sound image output unit 12052 may control the display unit 12062 such that an icon or the like indicating the pedestrian is displayed at a desired position.

An example of the vehicle control system to which the technique according to the present disclosure is applicable was described above. The technique according to the present disclosure is applicable to, for example, the imaging unit 12031 among the configurations described above. Specifically, the imaging devices according to the first to fifth embodiments can be applied to the imaging unit 12031. By applying the technique according to the present disclosure, a captured image can be quickly obtained and thus the image quality can be improved.

The present technique can be configured as follows:

(1) An imaging device including: a pixel array including a plurality of pixel circuits arranged in rows and columns, the pixel circuits photoelectrically converting incident light, a timing control circuit that specifies a detection pixel row or a detection pixel column including the pixel circuit having detected a luminance change of the incident light among the plurality of pixel circuits, on the basis of a first signal outputted for each row or each column from the pixel array; and a reading circuit that reads the first signal of the detection pixel row or the detection pixel column from the pixel array.

(2) The imaging device according to (1), wherein the timing control circuit transmits a frame synchronizing signal with a predetermined period, and the reading circuit reads the first signal across the plurality of frame synchronizing signals.

(3) The imaging device according to (2), wherein the reading circuit reads the first signal at certain intervals across the plurality of frame synchronizing signals.

(4) The imaging device according to (1), wherein the timing control circuit transmits a frame synchronizing signal in synchronization with the completion of the reading of the first signal by the reading circuit.

(5) The imaging device according to (1), further including an EVS signal processing unit that processes the first signal read from the reading circuit, wherein the EVS signal processing unit embeds at least one piece of dummy data in first output data according to the number of detection pixel rows or the number of detection pixel columns.

(6) The imaging device according to (5), wherein the EVS signal processing unit embeds the dummy data such that a plurality of frames have an equal number of pieces of the first output data.

(7) The imaging device according to (5) or (6), wherein the EVS signal processing unit combines the first output data of the plurality of frames.

(8) The imaging device according to (7), wherein the EVS signal processing unit embeds a frame start in the first output data of the leading frame of the plurality of frames and embeds a frame end in the first output data of the last frame.

(9) The imaging device according to (8), wherein the first output data of the last frame only includes the dummy data.

(10) The imaging device according to any one of (1) to (9), wherein each of the plurality of pixel circuits includes a first pixel circuit that outputs the first signal and a second pixel circuit that outputs a second signal corresponding to the luminance of the incident light, and the imaging device further includes an output interface that simultaneously outputs the first output data obtained by processing the first signal and second output data obtained by processing the second signal.

(11) The imaging device according to (10), wherein the plurality of second pixel circuits are provided for the first pixel circuit.

(12) The imaging device according to (10) or (11), wherein the output interface outputs the first output data and the second output data by using different virtual channels.

(13) The imaging device according to (10) or (11), wherein the output interface outputs a combination of multiple pieces of the first output data and a piece of the second output data.

(14) The imaging device according to (10) or (11), wherein the first output data and the second output data are embedded in the same data row.

(15) The imaging device according to (14), wherein a data header indicating an area of the first output data and an area of the second output data is embedded.

(16) The imaging device according to (15), wherein the data header is embedded at the head of the first output data and the head of the second output data.

(17) An electronic device including an imaging device including: a pixel array including a plurality of pixel circuits arranged in rows and columns, the pixel circuits photoelectrically converting incident light; a timing control circuit that specifies a detection pixel row or a detection pixel column including the pixel circuit having detected a luminance change of the incident light among the plurality of pixel circuits, on the basis of a first signal outputted for each row or each column from the pixel array; and a reading circuit that reads the first signal of the detection pixel row or the detection pixel column from the pixel array.

(18) A light detecting method including: specifying a detection pixel row or a detection pixel column including a pixel circuit having detected a luminance change of incident light among a plurality of pixel circuits, on the basis of a first signal outputted for each row or each column from a pixel array including the plurality of pixel circuits arranged in rows and columns, the pixel circuits photoelectrically converting the incident light; and reading the first signal of the detection pixel row or the detection pixel column from the pixel array.

REFERENCE SIGNS LIST

21 Pixel array
23 Timing control circuit
24 Reading circuit
25 EVS signal processing unit 27 Output interface
30 EVS pixel circuit
40 Pixel circuit
41 Gradation pixel circuit

The invention claimed is:

1. An imaging device comprising:
a pixel array including a plurality of pixel circuits arranged in rows and columns, the pixel circuits photoelectrically converting incident light;
a timing control circuit that specifies a detection pixel row or a detection pixel column including a corresponding pixel circuit having detected a luminance change of the incident light among the plurality of pixel circuits, on a basis of a first signal outputted for a row or a column from the pixel array;
a reading circuit that reads the first signal of the detection pixel row or the detection pixel column from the pixel array; and
a signal processing unit that processes the first signal read from the reading circuit,
wherein the signal processing unit embeds at least one piece of dummy data in first output data according to a number of detection pixel rows or a number of detection pixel columns.

2. The imaging device according to claim 1, wherein the signal processing unit embeds the dummy data such that a plurality of frames have an equal number of pieces of the first output data.

3. The imaging device according to claim 1, wherein the signal processing unit combines the first output data of a plurality of frames.

4. The imaging device according to claim 3, wherein the signal processing unit embeds a frame start in the first output data of a leading frame of the plurality of frames and embeds a frame end in the first output data of a last frame.

5. The imaging device according to claim 4, wherein the first output data of the last frame only includes the dummy data.

6. A light detecting method comprising:
specifying a detection pixel row or a detection pixel column including a pixel circuit having detected a luminance change of incident light among a plurality of pixel circuits, on a basis of a first signal outputted for each row or each column from a pixel array including the plurality of pixel circuits arranged in rows and columns, the pixel circuits photoelectrically converting the incident light;
reading, by a reading circuit, the first signal of the detection pixel row or the detection pixel column from the pixel array; and
processing, by a signal processing unit, the first signal read from the reading circuit,
wherein the signal processing unit embeds at least one piece of dummy data in first output data according to a number of detection pixel rows or a number of detection pixel columns.

7. An electronic device comprising an imaging device according to claim 1.

* * * * *